United States Patent [19]
Isaka

[11] Patent Number: 5,255,649
[45] Date of Patent: Oct. 26, 1993

[54] INTAKE AIR CONTROL SYSTEM FOR THE ENGINE

[75] Inventor: Yoshiharu Isaka, Iwata, Japan

[73] Assignee: Yamaha Hatsudoki Kabushiki Kaisha, Iwata, Japan

[21] Appl. No.: 893,111

[22] Filed: Jun. 3, 1992

Related U.S. Application Data

[63] Continuation-in-part of Ser. No. 834,604, Feb. 12, 1992.

[30] Foreign Application Priority Data

| Feb. 21, 1991 | [JP] | Japan | 3-047436 |
| Apr. 8, 1991 | [JP] | Japan | 3-101789 |
| Apr. 15, 1991 | [JP] | Japan | 3-111182 |
| Jun. 28, 1991 | [JP] | Japan | 3-185400 |
| Aug. 5, 1991 | [JP] | Japan | 3-218015 |
| Aug. 30, 1991 | [JP] | Japan | 3-247018 |
| Dec. 27, 1991 | [JP] | Japan | 3-360129 |

[51] Int. Cl.⁵ .................................................. F02B 31/00
[52] U.S. Cl. ................................. 123/308; 123/188.14
[58] Field of Search ............... 123/188.14, 306, 308, 123/432

[56] References Cited

U.S. PATENT DOCUMENTS

| 4,174,686 | 11/1979 | Shimizu et al. | 123/188.14 |
| 4,317,438 | 3/1982 | Yagi et al. | 123/432 |
| 4,320,725 | 3/1982 | Rychlik | 123/188 M |
| 4,354,463 | 10/1980 | Otani et al. | 123/306 |
| 4,413,598 | 11/1983 | Tsutsumi | 123/306 |
| 4,428,334 | 1/1984 | Klomp | 123/188 M |
| 4,499,868 | 2/1985 | Kanda et al. | 123/306 |
| 4,699,104 | 10/1987 | Okumura | 123/308 |
| 4,704,996 | 10/1987 | Morikawa | 123/306 |
| 4,714,063 | 12/1987 | Oda et al. | 123/308 |
| 4,719,886 | 1/1988 | Kotani et al. | 123/308 |
| 4,930,468 | 6/1990 | Stockhausen | 123/188.14 |
| 4,974,566 | 12/1990 | Lorusso | 123/308 |

FOREIGN PATENT DOCUMENTS

| 0054964A1 | 6/1982 | European Pat. Off. . | |
| 0068481A1 | 1/1983 | European Pat. Off. . | |
| 023528A1 | 9/1987 | European Pat. Off. . | |
| 0449240 | 10/1991 | European Pat. Off. | 123/306 |
| 3429414 | 2/1985 | Fed. Rep. of Germany . | |
| 3638021 | 11/1986 | Fed. Rep. of Germany . | |
| 56-43428 | 4/1981 | Japan . | |
| 56-139829 | 10/1981 | Japan . | |
| 61-12940 | 1/1986 | Japan . | |
| 61-44223 | 9/1986 | Japan . | |
| 63-73532 | 5/1988 | Japan . | |
| 2-115922 | 9/1990 | Japan . | |
| 2242226 | 9/1991 | United Kingdom . | |

OTHER PUBLICATIONS

European Search Report, Patent Abstracts of Japan vol. 10, No. 176 (M-491) (2232) Jul. 20, 1986 & JP-A-61 25 916 (Maxda Motor Corp) Feb. 5, 1986 *abstract*.

Patent Abstract of Japan vol. 10, No. 231 (M-506) & JP-A-61 065 064 (Nissan Motor Company) Apr. 3, 1986.

Primary Examiner—E. Rollins Cross
Assistant Examiner—Erick Solis
Attorney, Agent, or Firm—Ernest A. Beutler

[57] ABSTRACT

A number of embodiments of intake passages for internal combustion engines wherein it is possible to obtain a tumble and tumble and swirl action or both under some running conditions and substantially unrestricted flow under high speed conditions so as to improve volumetric efficiency while, at the same time, increasing turbulence under the conditions when the flow pattern is altered. The flow pattern is controlled by a rectifier plate which extends through at least one of the intake passages and divides it into two flow areas, one of which is closed by a control valve which engages the rectifier plate in its flow controlling position so as to provide a stop for the control valve. The control valve is configured and oriented so as to provide substantially unrestricted flow paths in each of its positions. Embodiments incorporating carbureted and fuel injected engines are depicted.

54 Claims, 5 Drawing Sheets

INTAKE AIR CONTROL SYSTEM FOR THE ENGINE

CROSS REFERENCE TO RELATED APPLICATION

This application is a continuation-in-part of my co-pending application entitled "Tumble Control Valve for Intake Port," Ser. No. 834,604, filed Feb. 12, 1992 and assigned to the Assignee hereof.

BACKGROUND OF THE INVENTION

This invention relates to an intake air control system for an engine and more particularly to a control valve and rectifier plate arrangement for the induction system of an engine.

As is noted in my co-pending application aforenoted, the design of the intake passage and induction system of an internal combustion engine is very important in determining its performance under all running conditions. As is also noted in that application, various devices have been proposed for inducing particular types of motion within the cylinder at least under some running conditions so as to improve mixture distribution and turbulence in the combustion chamber. However, these turbulence inducing devices should not interfere with the volumetric efficiency at high speeds.

There are disclosed in that co-pending application a number of arrangements wherein the induction system is provided with devices and valve arrangements so as to generate either swirl, swirl and tumble, tumble or no restriction depending upon the running condition of the engine. In one embodiment of that application (the embodiment of FIGS. 30 and 31), the control valve, which forms one of the main elements of the induction system control cooperates with a rectifier plate formed in the intake passage and which rectifier plate does not substantially interfere with the flow when the control valve is open but when the control valve is closed operates to change the flow pattern entering the combustion chamber. Although that type of arrangement has a number of advantages, the construction shown in the aforenoted co-pending application also could be improved upon in some regards.

One area in which improvement was possible was in the actual cooperation between the control valve and the rectifier plate. In the aforenoted described embodiment of the co-pending application, the control valve rotates from an open position generally opposite to the direction of air flow to the position wherein the flow is redirected by the control valve and the rectifier plate. With this arrangement, there must be provided some clearance between the control valve and the rectifier plate to ensure against interference. As a result, it may not be possible to completely close off the flow through the portion of the intake passage which the control valve is designed to close.

It is, therefore, a principal object of this invention to provide an improved intake air control system for an engine that embodies a control valve and a rectifier plate.

It is a further object of this invention to provide an improved intake air control system for an internal combustion engine embodying a rectifier plate and control valve and wherein the control valve directly seals against the rectifier plate when it is in its flow controlling position.

With the arrangement shown in the aforenoted co-pending application, there must be provided some form of stop mechanism to limit the movement of the control valve in its flow controlling position. This stop mechanism is positioned generally externally of the engine and must, of course, be correctly positioned and adjusted. This has certain obvious disadvantages.

It is, therefore, a further object of this invention to provide an improved intake air control system for an engine embodying a rectifier plate and control valve and wherein the control valve engages the rectifier plate so as to limit its movement in one direction.

In the embodiment afore referred to of my co-pending application, the control valve is a generally cylindrical member having a cut away portion that is journaled for rotation in the cylinder head about an axis that is disposed transversely to the flow path of the intake charge through the intake passage and at a bight of the intake passage. With this type of arrangement, the control valve can provide a continuous intake passage surface without interruptions when it is in its open, non-flow controlling position. Because of the orientation of the components in the afore described embodiment of the co-pending application, when the control valve is in its flow restricting position, a pocket or cavity is formed in the cylinder head on the upstream side of the intake passage from the control valve. Fuel may condense and accumulate in this cavity and the cavity furthermore can create undesired turbulence in the cylinder head passage.

It is, therefore, a further object of this invention to provide an improved arrangement for the control valve, cylinder head and associated rectifier plate wherein the control valve functions to provide a continuous flow path regardless of whether the control valve is in its open position or in its flow controlling position.

When a rectifier plate is employed in conjunction with the intake passage of the cylinder head and as noted in the aforenoted co-pending application, it is necessary to separately form this rectifier plate as a part of the cylinder head, which requires a complicated casting technique, or the insertion of the rectifier plate as a separate element. That application discloses a way in which the construction can be simplified by employing a combined rectifier plate and valve seat. However, there may be some advantages in some instances in using a separate rectifier plate which then gives rise to the problem of its attachment and location within the cylinder head.

It is a further object of this invention to provide an improved rectifier plate construction for the intake port of a cylinder head wherein the rectifier plate may be formed as a separate element but may be easily held into the cylinder head without requiring additional components.

It is a further object of this invention to provide an improved arrangement wherein a rectifier plate for the intake system of an internal combustion engine cylinder head may be easily held in place by the valve seat of the cylinder head.

SUMMARY OF THE INVENTION

A first feature of this invention is adapted to be embodied in a cylinder head arrangement for an internal combustion engine comprising a passage extending from an opening in one surface of the cylinder head to a valve seat formed in another surface of the cylinder head. A rectifier plate is positioned in the passage adjacent the valve seat and defines two separate flow paths in the passage. Valve means are supported in the cylinder head and movable between a first position permitting unrestricted flow through both of the flow paths and a second position engaged with the rectifier plate and restricting the flow through only one of the flow paths.

Another feature of the invention is also adapted to be embodied in a cylinder head arrangement for an internal combustion engine comprising a passage extending from an opening in one surface of the cylinder head to a valve seat formed in another surface of the cylinder head. A rectifier plate is positioned in the passage adjacent the valve seat and defines two separate flow paths in the passage. Valve means are supported in the cylinder head and movable between a first position permitting unrestricted flow through both of the flow paths and a second position restricting flow only through one of the flow paths. The valve means defines a substantially unrestricted surface between the passage and the rectifier plate when it is in its second position.

A further feature of the invention is also adapted to be embodied in a cylinder head arrangement for an internal combustion engine. In accordance with this feature of the invention, a passage extends through the cylinder head from an opening in one surface of the cylinder head to another surface of the cylinder head which forms a portion of the combustion chamber. The area of the passage adjacent this other surface is formed with a counterbore. A rectifier plate extends into the passage adjacent this counterbore and defines two separate flow paths in the passage. The rectifier plate has a portion that extends into the counterbore. A valve seat is pressed into the counterbore for cooperation with a poppet valve for controlling the flow through the passage and this valve seat retains the rectifier plate in position through cooperation with the portion of the rectifier plate that extends into the counterbore.

DETAILED DESCRIPTION OF THE PREFERRED EMBODIMENTS OF THE INVENTION

Figure 1:
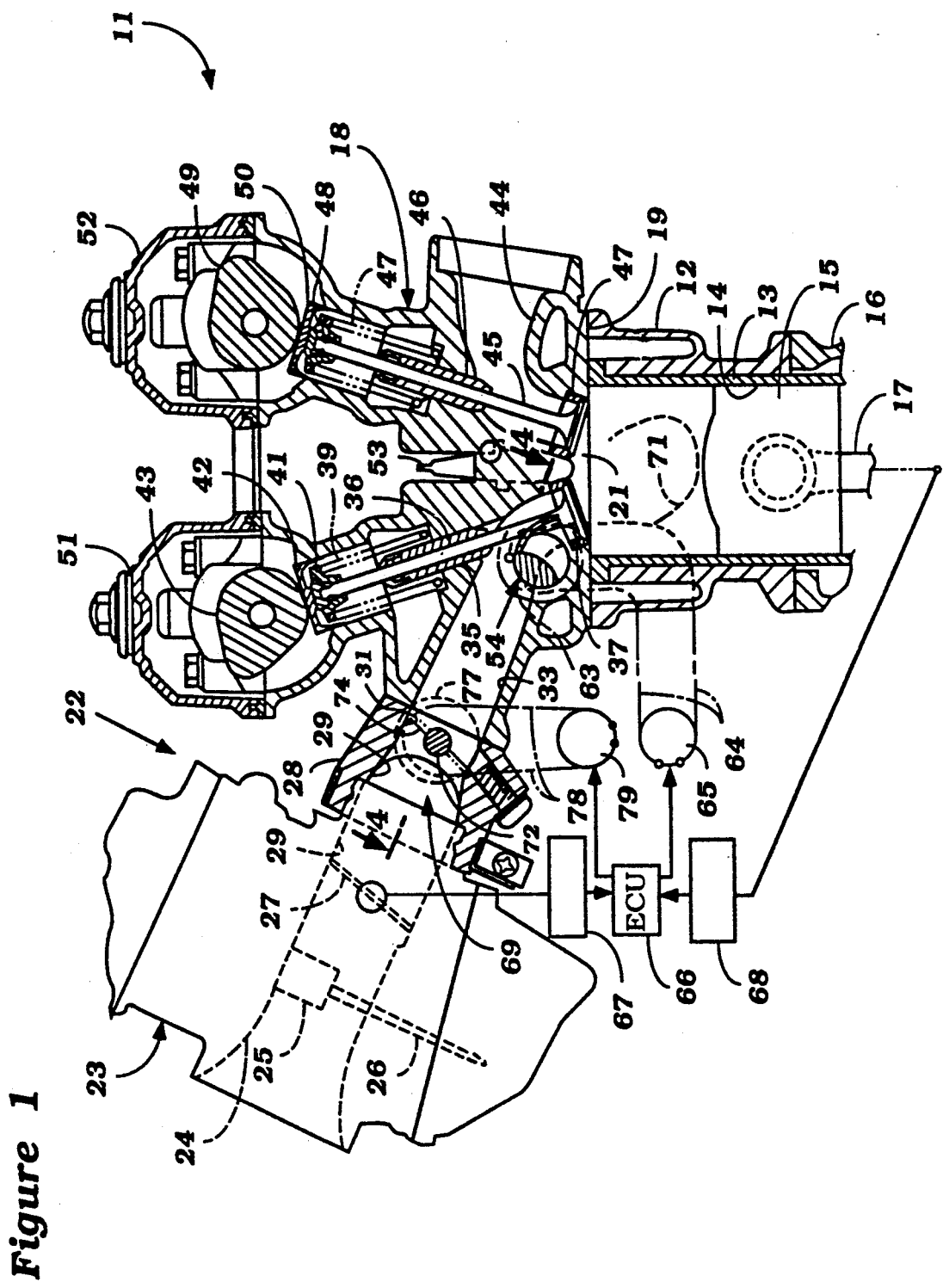
FIG. 1 is a partial view of an internal combustion engine constructed in accordance with an embodiment of the invention, with a portion broken away and shown in cross section.

Referring first to the embodiment of FIGS. 1-5 and initially primarily to FIG. 1, an internal combustion engine constructed in accordance with this embodiment of the invention is illustrated partially and is identified generally by the reference numeral 11. The invention deals primarily with the induction system for the engine 11 and for that reason, only the induction portion of the engine has been illustrated in detail along with certain adjacent components for orientation purposes. In addition, a cross-sectional view taken through only a single cylinder of the engine 11 is all that is believed to be necessary to understand the construction and operation of this embodiment. It is believed obvious to those skilled in the art how the invention can be employed in conjunction with multiple cylinder engines of any configuration.

The engine 11 includes a cylinder block 12 having a pressed or cast-in cylinder liner 13 that forms a cylinder bore 14 in which a piston 15 reciprocates. The cylinder block 12 is affixed to a crankcase member, shown partially at 16, in which a crankshaft (not shown) is supported for rotation. A connecting rod 17 connects the piston 15 to the crankshaft for driving the crankshaft in a well known manner.

A cylinder head assembly, indicated generally by the reference numeral 18, is affixed to the cylinder block 12 in an appropriate manner. The cylinder head 18 has a lower surface 19 that is matingly engaged with the upper portion of the cylinder block 12 and cylinder liner 13 and which defines a combustion chamber in part by means of a recess 21 formed in the lower surface 19 of the cylinder head 18.

A fuel/air charge is delivered to the combustion chambers 21 by an induction system, indicated generally by the reference numeral 22. In this embodiment, the induction system includes a charge former 23 in the form of a variable venturi carburetor 23 which draws atmospheric air from an air cleaner (not shown). The carburetor 23 is formed with an induction passage 24 in which a sliding throttle piston 25 is supported for reciprocation, which piston is operated to maintain a constant pressure drop through the induction passage 24 regardless of the speed of running of the engine. In addition, a metering rod 26 is affixed to the throttle piston 25 for controlling the supply of fuel delivered to the induction passage 24 by the idle and main circuits (not shown) of the carburetor 23.

A manually operated throttle valve 27 is positioned in the carburetor induction passage 24 for controlling the speed of operation of the engine 11 in a known manner. The carburetor 23 is the type normally used in a motorcycle and the engine 11 in this embodiment may be employed to empower a motorcycle. As will become apparent by description of certain other embodiments, it is to be understood that the invention may be practiced in conjunction with other applications for internal combustion engines. The invention, however, has particular utility in conjunction with engines that operate over widely varying speed and load ranges for reasons which will become apparent.

The carburetor 23 supplies its fuel air charge to a short Siamese type intake manifold 28 that has a single inlet opening 29 that registers with the carburetor intake passage 24 and a pair of outlet openings 31 and 32 that respectively communicate with the inlet openings of a pair of intake passages 33 and 34 formed in the cylinder head 18. It is to be understood that in this embodiment each combustion chamber 21 is served by a pair of intake passages 33, 34 with the intake passage 33 being considered as the primary intake passage and the intake passage 34 functioning as the secondary intake passage. As will be readily apparent, the invention may be employed in conjunction with engines having only a single intake passage for each combustion chamber 21 or more than two intake passages for each combustion chamber.

It should be noted that each intake passage 33 and 34 has a generally L-shaped configuration with a straight section running from the inlet openings that communicate with the manifold 28 and a shorter section that is angularly disposed to this first section and which communicates directly with the combustion chamber 21. These sections meet at a bight, the significance of which will become apparent.

Intake valves 35 of the poppet type are slidably supported in the cylinder head 18 by respective valve guides 36 and have head portions that control the opening and closing of valve seats 37 pressed into counterbores 38 in the cylinder head recess 21 at the termination of the respective intake passages 33 and 34.

Coil compression springs 39 act against the cylinder head 18 and keeper retainer assemblies 41 affixed to the upper ends of the stems of the valves 35 for urging the valves 35 to their closed position in engagement with the valve seats 37. A thimble type tappet 42 is slidably supported in the cylinder head 18 and associated with the stem of each intake valve 35. An overhead mounted intake cam shaft 43 is driven from the engine crankshaft in a known manner and operates the thimble tappets 42 for effecting opening of the intake valves 35.

A pair of exhaust passages 44 extend through the opposite side of the cylinder head 18 from the intake passages 33 and 34 and communicate with a suitable exhaust system (not shown) for discharging the exhaust gases to the atmosphere, for silencing the exhaust gases and if desired, for catalytically treating the exhaust gases. Exhaust valves 45 are supported for reciprocation in the cylinder head 18 by means of pressed in valve guides 46 and have head portions that cooperate with valve seats 47 formed at the termination of the exhaust ports 44 where they communicate with the combustion chamber 21. The valve seats 47 are, like the intake valve seats 37, pressed into appropriate counterbores in the cylinder head 18.

Coil compression springs 47 act against the cylinder head 18 and keeper retainer assemblies 48 fixed to the exhaust valves 46 for urging the exhaust valves to their closed position in engagement with the valve seats 48. An exhaust cam shaft 49 is rotatably journaled in the cylinder head 18 for opening the exhaust valves 45 through thimble tappets 50. The exhaust cam shaft 49 is like the intake cam shaft 43 driven by the crankshaft of the engine in an appropriate manner. Cam covers 51 and 52 are affixed to the cylinder head 18 in an appropriate manner and enclose the respective intake and exhaust cam shafts 43 and 49.

A spark plug 53 is mounted centrally in the cylinder head 18 with its gap centrally positioned in the recess 21 for firing the fuel/air charge admitted to the combustion chamber 21 by the induction system 22. The spark plug 53 may be fired by any appropriate spark control circuit.

The construction of the engine 11 as thus far described may be considered to be conventional. The invention relates to an arrangement whereby the flow path of the intake charge entering the combustion chamber 21 from the intake passages 33 and 34 may be varied under certain running conditions so as to induce turbulence by means of generating a tumble and/or tumble or swirl in the combustion chamber 21 under low and mid-range operations. Such turbulence increasing arrangement improves flame propagation and ensures complete combustion within the combustion chamber 21 even under extreme idle and low speed conditions. However, the construction of the induction system is such that the charge entering the combustion chambers 21 under high speed is substantially unrestricted so as to provide good volumetric efficiency and maximum power output.

These results are achieved by providing a control valve, indicated generally by the reference numeral 54, which is positioned in the cylinder head 18 at the bights of the intake passages 33 and 34. To this end, the cylinder head 18 is provided with a transversely extending bore 55 which extends through the bight area in which a generally cylindrical portion of the control valve 54 is journaled. However, in the area of the intake passages 33 and 34, there is provided a respective cut-out 56 in the control valve 54. In this embodiment, the cutout 56 for each intake passage 34 and 35 is substantially the same. It is to be understood, however, that different configurations may be employed so as to achieve different flow patterns of the charge entering the combustion chamber 21 from the intake passages 33 and 34 during the time period when the control valve 54 is in one of its flow controlling positions.

The cut-outs 56 are generally configured so that when the control 54 is in its fully opened position that the cut-outs 56 will form a smooth, continuous extension of the intake passages 33 and 34 so that no flow obstruction will be encountered. However, when the control valve 54 is in its fully controlled position as shown in the Figures, the cylindrical portion of the control valve 54 will protrude into the intake passages 33 and 34 so as to direct the flow of intake charge therethrough toward the center side of the cylinder. This will effect a generally tumble type of action in the combustion chamber 31 when the control valve 54 is in this position, as described more fully in my afore noted co-pending application.

To further generate this tumble motion, a rectifier plate assembly, indicated generally by the reference numeral 57, is positioned in the primary intake passage 33 in this embodiment. In this embodiment, the rectifier plate 57 is only positioned in the primary intake passage 33 but it is to be understood that such a rectifier plate may be employed in conjunction with the secondary intake passage 34 also. In addition, if only a single intake passage is employed for each cylinder, then a rectifier plate 57 will be provided in that single intake passage.

Figure 2:
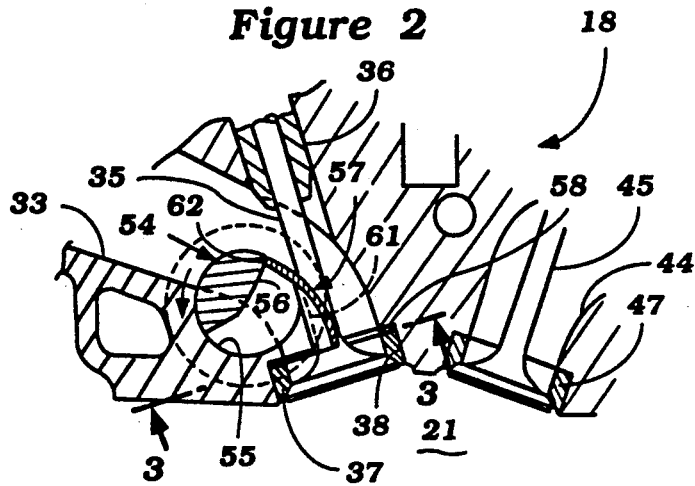
FIG. 2 is a further enlarged view of the combustion chamber area of the engine and the intake port taken along the same plane as FIG. 1.
Figure 3:
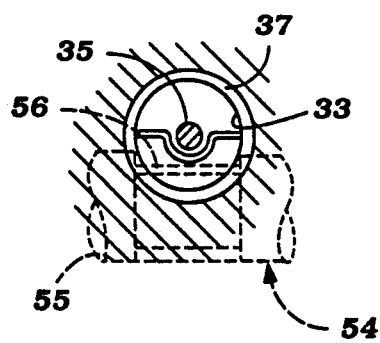
FIG. 3 is a cross-sectional view taken along the line 3—3 of FIG. 2.
Figure 5:
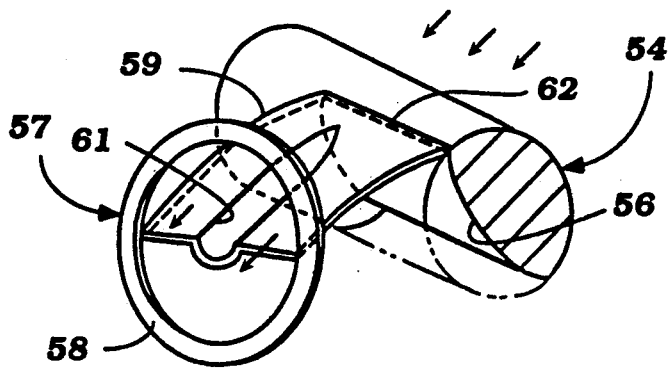
FIG. 5 is an enlarged perspective view showing the cooperation of the control valve with the rectifier plate.

As may be best seen in FIGS. 2 and 5, the rectifier plate 57 is formed with a generally cylindrical base part 58 that is received within the cylinder head counterbore 38 beneath the valve seat 37 and thus is held in place by the valve seat 37. In addition, the rectifier plate 57 has a rectifying portion 59 that extends into the intake passage 33 and divides it into two portions, one on each side of the axis of the intake valve 35. The rectifier portion 59 is formed with a cylindrical recess 61 that provides a clearance for the stem of the intake valve 35 but provides good definition between the two sides of the flow path defined thereby.

As may be apparent from FIGS. 1 and 2, when the control valve 54 rotates from its fully opened position in a clockwise direction, the cut-out 56 is positioned so that it will contact an upper edge 62 of the rectifier plate portion 59 and thus provide an effective seal across this side of the intake passage 33 so as to substantially preclude any flow through one side of the intake passage 33. As a result, substantially all of the flow will be channeled toward the other side so as to further promote the tumble operation. In addition, this contact of the control valve cut-out 56 with the rectifier plate edge 62 will act as a stop so as to limit the degree of rotation of the control valve 57 into its flow controlling position.

In addition to this advantage, it should be noted that the flow controlling position of the control valve 54 is such that there is not cavity formed in the intake passage upstream of the control valve 54 when in its flow controlling position in which fuel could tend to condense and accumulate. Said another way, the flow controlling valve 54 in its flow controlling position actually forms an extension of the surface of the cylinder head which defines the intake passage 33 and thus smoothly guides the air flow to the side of the rectifier plate 57 opposite the outside of the cylinder bore. Hence, the flow control valve 54 provides a smooth flow surface in both its open position and in its flow controlling position.

The flow control valve 54 has a pulley 63 affixed to an end which is exposed through one side of the cylinder head 18. A pair of wire transmitters 64 are connected to the pulley 63 and to a driving pulley 65 driven by a motor that is controlled by an ECU 66 so as to position the flow control valve 54 in a position dependent upon engine operating conditions. In the illustrated embodiment, these conditions are throttle valve position, as sensed by a throttle position sensor 67, and engine speed, as sensed by a crank shaft rotational speed sensor 68. As has been previously noted, the control valve 54 is positioned in its flow controlling position primarily at idle and low speed low load conditions.

In addition to the control valve 54, there is further provided a throttle valve arrangement, indicated generally by the reference numeral 69, for controlling the flow through the secondary intake passage 34 to close this passage under some conditions so that all of the intake charge is delivered to the combustion chamber 21 through the primary intake passage 33. As will become apparent, this construction and throttle valve assembly is effective to further induce turbulence in the combustion chamber 21 and induce a generally helical flow path in the combustion chamber as indicated by the broken line 71 in FIG. 1.

Figure 4:
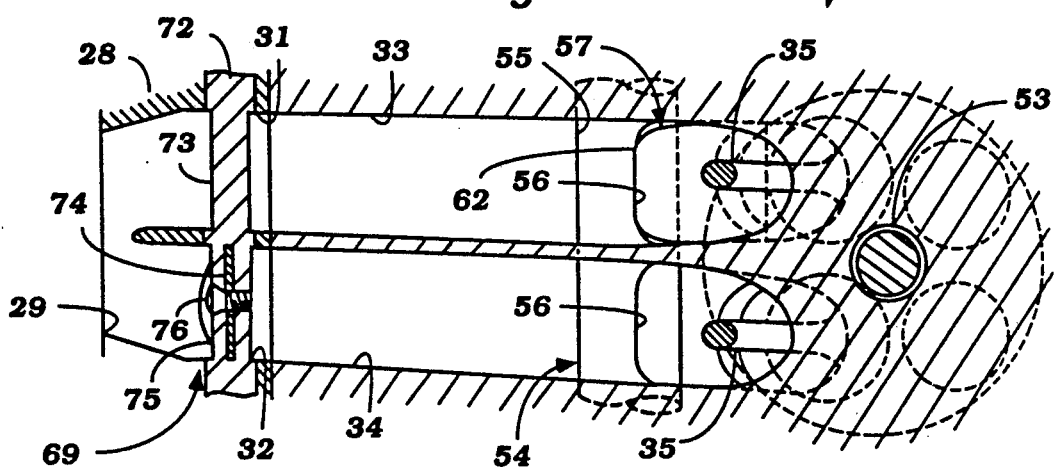
FIG. 4 is an enlarged cross-sectional view taken along the line 4—4 of FIG. 1.

The throttle valve arrangement 69 includes a throttle valve shaft 72 that is journaled in the manifold 28 and which has a first small diameter portion 73 that extends through the primary intake passage 33 so as to offer relatively low flow resistance. A throttle plate 74 is, however, affixed to a reduced diameter portion 75 of the shaft 72 which passes through the secondary intake passage 34 and is held in place by a screw 76. When the throttle plate 74 is in its closed position as shown in FIG. 4, all of the intake charge for the engine must pass through the intake passage 33 so as to provide the desired flow path.

A pulley 77 is affixed to the throttle valve shaft 72 at an exposed end thereof and is operated by means of a pair of wire transmitters 78 that are connected to a drive pulley 79 of a servo motor which is controlled by the ECU 66. Although a wide variety of control strategies may be employed, in a preferred one the ECU positions the throttle valve 74 in its closed position and the control valve 54 in its flow controlling position when the engine is operating at idle or off idle. This induces maximum turbulence in the combustion chamber and the afore noted helical flow pattern in the combustion chamber so as to ensure rapid flame propagation when the spark plug 53 is fired and so as to also ensure that a stoichiometric fuel/air mixture will be present at the gap of the spark plug at the time of ignition.

As the engine speed and/or load increases, the throttle valve 69 is first opened while the control valve 54 is still maintained in its flow controlling position. This changes the motion within the combustion chamber 21 from the helical flow pattern to a tumble type of flow pattern. Then as the speed and load further increases, the control valve 54 is positioned in its open position so as to permit unrestricted flow into the combustion chamber 21 and maximum volumetric efficiency. As has been noted, this is only a preferred sequence of operation and various other sequences of operation may be employed depending upon the type of motion which is desired in the combustion chamber under the various running conditions.

Figure 6:
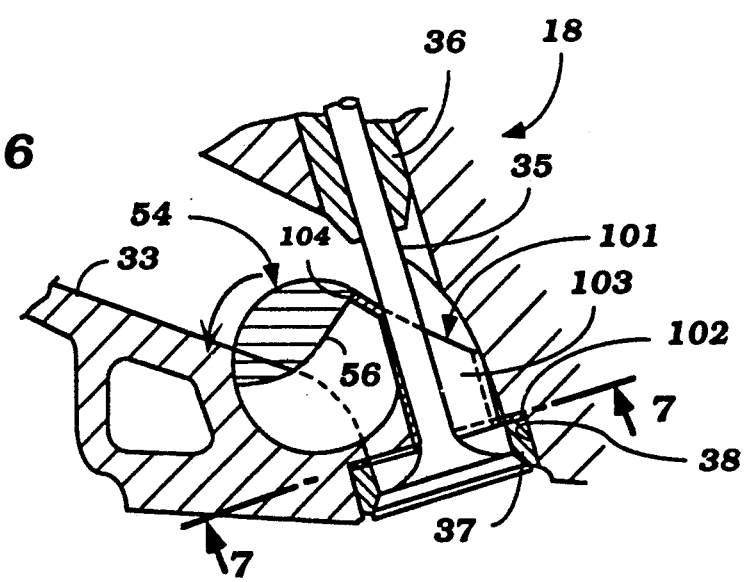
FIG. 6 is a cross-sectional view, in part similar to FIG. 2, and shows another embodiment of the invention.
Figure 7:
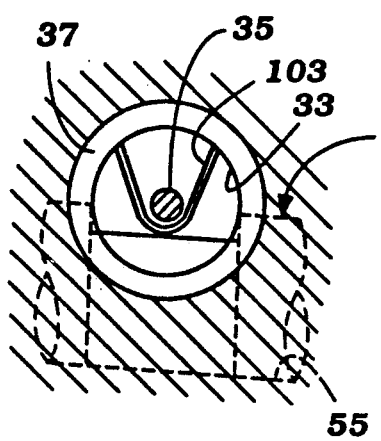
FIG. 7 is a cross-sectional view taken along the line 7—7 of FIG. 6.
Figure 8:
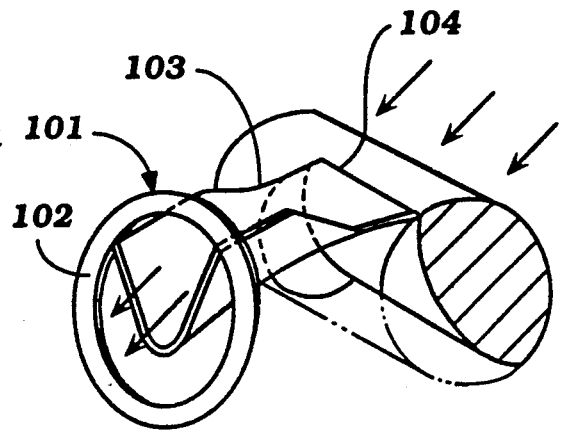
FIG. 8 is a perspective view, in part similar to FIG. 5, showing the cooperation of the control valve with the rectifier plate in this embodiment.

In the embodiment of FIGS. 1-5, the rectifier plate 57 has had the effect of dividing the primary intake passage 33 into two substantially equal flow areas. FIGS. 6-8 show another embodiment of the invention wherein the configuration of the rectifier plate is such so as to provide a substantially smaller flow area through the intake passage 33 when the control valve 54 is in its closed position than one-half of its surface area. Since this is the only difference between this embodiment and the previously described embodiment, components which are the same as the previously described embodiments have been identified by the same reference numerals and will be described again only insofar as is necessary to understand the construction and operation of this embodiment.

The rectifier plate of this embodiment is identified generally by the reference numeral 101 and is comprised of a cylindrical base portion 102 that is received within the counterbore 38 of the cylinder head and which is retained in place by the valve seat 37. A plate portion 103 extends outwardly from the base 102 and has a generally V-shaped configuration and which terminates in an upper edge 104 that is contacted by the control valve cut-out 56 to limit its movement in the flow controlling position. As may be seen, the plate portion 103 because of its V shape defines a relatively small flow area which is directed more toward the center of the cylinder than the previously described embodiment and which will generate a higher flow velocity and more turbulence. Like the previously described embodiment, such a rectifier plate may be positioned in only one of plural intake passages serving the same cylinder or, alternatively, may be provided in all of the intake passages serving the same cylinder. In addition, this configuration may be employed in engines having only one intake passage per cylinder.

Figure 9:
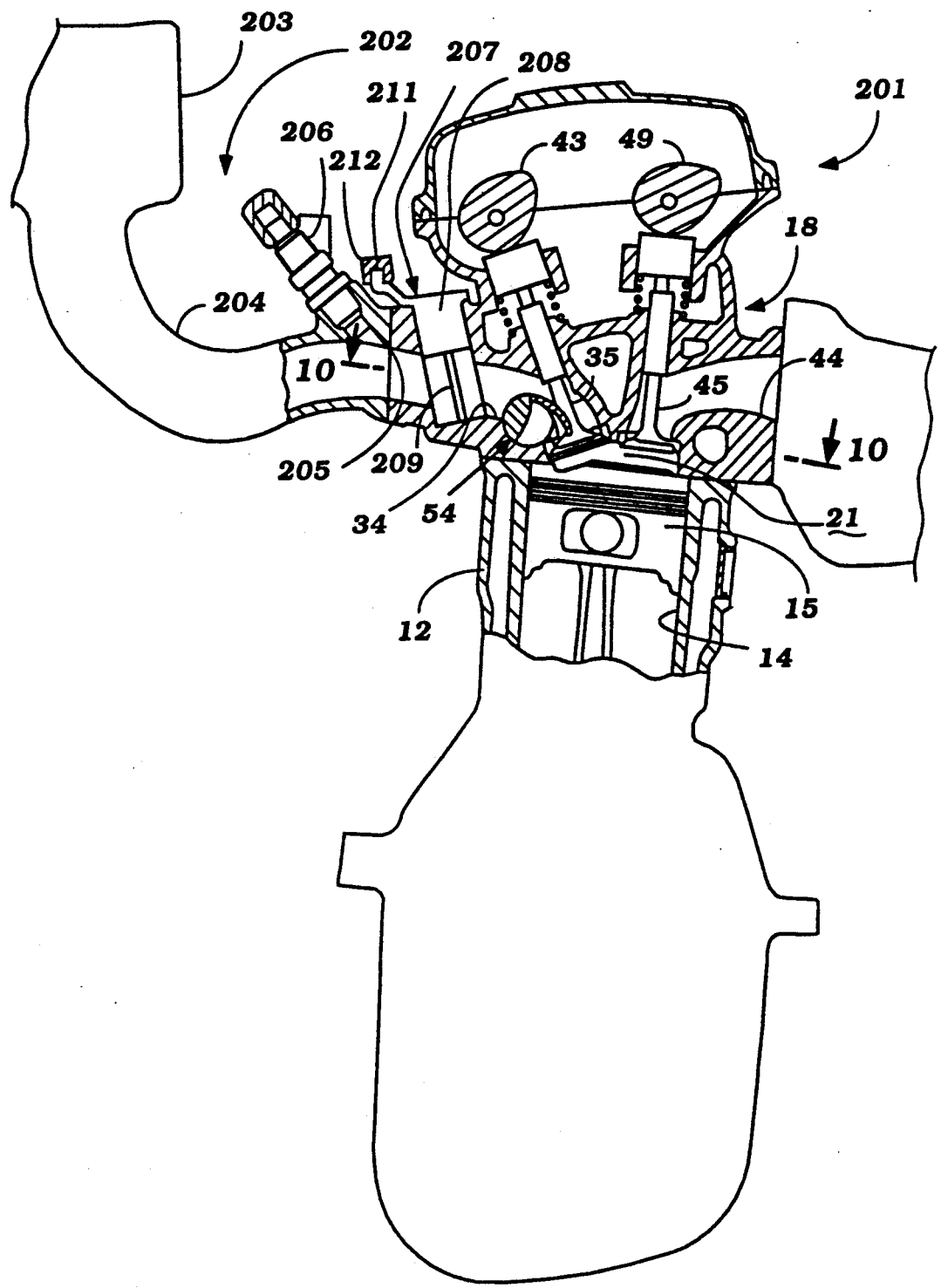
FIG. 9, is a side elevational view of an internal combustion engine constructed in accordance with a third embodiment of the invention, with a portion broken away.
Figure 10:
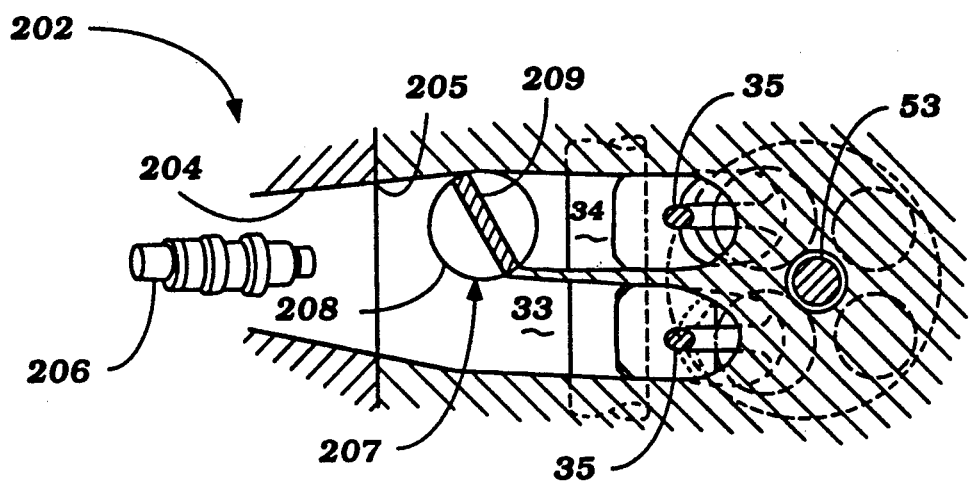
FIG. 10 is a cross-sectional view taken along the line 10—10 of FIG. 9.

FIGS. 9 and 10 illustrate another embodiment of the invention which is generally the same as the previously described embodiments and, for that reason, components of this embodiment which are the same or substantially the same as the previously described embodiments have been identified by the same reference numerals and will not be described again, except insofar as is necessary to understand the construction and operation of this embodiment.

An engine constructed in accordance with this embodiment is indicated generally by the reference numeral 201 and is designed primarily for automotive application. The engine 201 is provided with an induction system, indicated generally by the reference numeral 202, and which includes a plenum chamber 203 into which air is drawn from the atmosphere through a suitable intake (not shown) in which a speed controlling throttle valve is positioned. The plenum chamber 203 is provided with a plurality of individual runners 204, each of which serves a respective intake opening 205 formed in a side of the cylinder head 18. In this embodiment, the common intake opening 205 of the cylinder head serves the two passages 33 and 34. Hence, this embodiment employs a Siamese type of intake passage configuration but still employs two intake passages 33 and 34 for each cylinder.

In this embodiment, a fuel/air charge is generated by a fuel injector 206 which is mounted in each manifold runner 204 and which sprays fuel therein under any appropriate control strategy.

In the previously described embodiment, the throttle valve 72 had a shaft portion 73 which extended through the primary intake passage 33 and thus provided some, although minimal, flow resistance in this passage. The advantage of the construction of the previously described embodiments was that all of the throttle valves can be fixed to a common throttle valve shaft. In this embodiment, however, a throttle valve arrangement, indicated generally by the reference numeral 207, is provided for each cylinder of the engine. The throttle valve assembly 207 includes a cylindrical portion 208 that is journaled in an appropriate bore formed in the cylinder head 18 and which extends transversely or perpendicularly to the flow path through the secondary intake passage 34. In the portion of the throttle valve 207 that passes through the passage 34, there is provided a valve plate 209 which in its closed position as shown in the figures, substantially precludes any flow through the secondary intake passage 34 and hence, will divert all of the flow through the primary intake passage 33 with the effect as afore noted. However, when the throttle valve assembly 207 is rotated, the valve plate 209 will extend parallel to the flow path and provide only minimal resistance.

Each of the throttle valves 207 is provided with an outwardly extending arm 211 to which a throttle link 212 is connected so as to interconnect the throttle valves 207 of each cylinder with each other so as to provide simultaneous movement therebetween. Any form of rectifier plate may be employed with the intake passage 33 and/or intake passage 34 in an embodiment of this construction including those as previously described.

It should be readily apparent from the foregoing description that the described construction is effective in ensuring the desired degree of turbulence and air flow within the combustion chamber under all running conditions. In addition, the rectifier plate-control valve combination operates in such a way as to ensure the desired flow pattern, provide a smooth flow path in all conditions of the control valve and to provide a positive stop for the opening movement of the control valve. Of course, the foregoing description is that of preferred embodiments of the invention and various changes and modifications may be made without departing from the spirit and scope of the invention, as defined by the appended claims.

I claim:

1. A cylinder head arrangement for an internal combustion engine comprising a passage extending from an opening in one surface area of said cylinder head to a valve seat formed in another surface area of said cylinder head which other surface defines in part a combustion chamber, a rectifier plate in said passage adjacent said valve seat and defining two separate flow paths in said passage, one of said flow paths terminating substantially at one side of said combustion chamber and the other of said paths terminating more centrally of said combustion chamber than said first path, and valve means supported in said cylinder head and movable between a first position permitting unrestricted flow through both of said flow paths and a second position engaged with said rectifier plate and restricting flow through only said one flow path for directing more flow centrally into said combustion chamber.

2. A cylinder head arrangement as set forth in claim 1 wherein the rectifier plate is contacted by the valve means upon movement of the valve means into its second position for limiting the degree of movement of said valve means.

3. A cylinder head arrangement as set forth in claim 1 wherein the rectifier plate is configured so as to offer substantially no flow resistance to the flow through the passage when the valve means is in its first position.

4. A cylinder head arrangement for an internal combustion engine comprising a passage extending from an opening in one surface area of said cylinder head to a valve seat formed in another surface area of said cylinder head, a rectifier plate in said passage adjacent said valve seat and defining two separate flow paths in said passage, both of which terminate only at said valve seat and valve means supported in said cylinder head and movable between a first position spaced from said rectifier plate for permitting unrestricted free flow through both of said flow paths to said valve seat and a second position engaged with said rectifier plate and precluding flow through one of said flow paths to said valve seat and permitting free flow through the other of the flow paths to said valve seat.

5. A cylinder head arrangement as set forth in claim 4 wherein the valve means is configured so as to provide a continuous flow surface along the passage and rectifier plate when in its second position so as to provide no upstream gaps in the surface approaching the rectifier plate.

6. A cylinder head arrangement as set forth in claim 5 wherein the rectifier plate is contacted by the valve means upon movement of the valve means into its second position for limiting the degree of movement of said valve means.

7. A cylinder head arrangement as set forth in claim 6 wherein the rectifier plate is configured so as to offer substantially no flow resistance to the flow through the passage when the valve means is in its first position.

8. A cylinder head arrangement as set forth in claim 5 wherein the passage is formed by a pair of angularly related sections meeting at a bight, the valve means being positioned at the bight.

9. A cylinder head arrangement as set forth in claim 8 wherein the valve means is a rotary control valve rotating about an axis that is disposed substantially at the bight and which extends transversely to the flow path through the passage.

10. A cylinder head arrangement as set forth in claim 9 wherein the rectifier plate is contacted by the valve means upon movement of the valve means into its second position for limiting the degree of movement of said valve means.

11. A cylinder head arrangement as set forth in claim 10 wherein the rectifier plate is configured so as to offer substantially no flow resistance to the flow through the passage when the valve means is in its first position.

12. A cylinder head arrangement for an internal combustion engine comprising a passage extending from an opening in one surface area of said cylinder head to a valve seat formed in another surface area of said cylinder head, a rectifier plate in said passage adjacent said valve seat and defining two separate flow paths in said passage, and valve means supported in said cylinder head and movable between a first position permitting unrestricted flow through both of said flow paths and a second position engaged with said rectifier plate and restricting flow through only one of said flow paths, said valve means comprising a rotary control valve having a generally cylindrical configuration with a cut-out portion therein.

13. A cylinder head arrangement as set forth in claim 12 wherein the valve means provides a substantially continuous surface area with the cylinder head in each of its positions.

14. A cylinder head arrangement as set forth in claim 13 wherein the portion of the valve means which extends through the passage is provided with a cut-out.

15. A cylinder head arrangement for an internal combustion engine comprising a passage extending from an opening in one surface area of said cylinder head to a valve seat formed in another surface area of said cylinder head, a rectifier plate in said passage adjacent said valve seat and defining two separate flow paths in said passage, and valve means supported in said cylinder head and movable between a first position permitting unrestricted flow through both of said flow paths and a second position engaged with said rectifier plate and restricting flow through only one of said flow paths, said rectifier plate being comprised of a plate portion extending into the passage and a base portion retained within the valve seat.

16. A cylinder head arrangement as set forth in claim 15 wherein the valve seat is formed by a counterbore at the other surface area of the cylinder head and into which a valve seat is inserted, the rectifier plate base portion being received in said counterbore and retained in place by said valve seat.

17. A cylinder head arrangement for an internal combustion engine comprising a first passage extending from an opening in one surface area of said cylinder head to a valve seat formed in another surface area of said cylinder head forming in part a combustion chamber, a rectifier plate in said passage adjacent said valve seat and defining two separate flow paths in said passage, valve means supported in said cylinder head and movable between a first position spaced from said rectifier plate for permitting unrestricted flow through both of said flow paths and a second position engaged with said rectifier plate and restricting flow through only one of said flow paths, and a second passage serving the same combustion chamber of the engine, said valve means controlling the flow through said first passage.

18. A cylinder head arrangement as set forth in claim 17 further including a throttle valve for controlling the flow through the second passage for directing the flow to the combustion chamber through the first passage when the throttle valve is in its closed position.

19. A cylinder head arrangement as set forth in claim 18 wherein the rectifier plate and the valve means are disposed only in the first passage.

20. A cylinder head arrangement as set forth in claim 19 wherein the passages are each formed by a pair of angularly related sections meeting at a bight, the valve means being positioned at the bight.

21. A cylinder head arrangement as set forth in claim 20 wherein the valve means is a rotary control valve rotating about an axis that is disposed substantially at the bight and which extends transversely to the flow path through the passages.

22. A cylinder head arrangement as set forth in claim 21 wherein the throttle valve is rotatable about an axis that extends across the passages and wherein the valve means and the throttle valve rotate about parallel axes.

23. A cylinder head arrangement as set forth in claim 21 wherein the throttle valve rotates about an axis passing through the center of the second passage and wherein the valve means is a rotary control valve and the axis of the throttle valve extends generally perpendicularly to the axis of the control valve.

24. A cylinder head arrangement as set forth in claim 1 wherein the rectifier plate divides the passage so that the two separate flow paths have substantially different flow areas and wherein the valve means directs the flow through the smaller flow area when in its second position.

25. A cylinder head arrangement as set forth in claim 24 wherein the rectifier plate is comprised of a plate portion extending into the passage and a base portion retained within the valve seat.

26. A cylinder head arrangement as set forth in claim 25 wherein the valve seat is formed by a counterbore at the other surface area of the cylinder head and into which a valve seat is inserted, the rectifier plate base portion being received in said counterbore and retained in place by said valve seat.

27. A cylinder head arrangement for an internal combustion engine comprising a passage extending from an opening in one surface area of said cylinder head to a valve seat formed in another surface area of said cylinder head, a rectifier plate in said passage adjacent said valve seat and defining two separate flow paths in said passage, and valve means supported in said cylinder head and movable between a first position permitting unrestricted flow through both of said flow paths and a second position restricting flow through only one of said flow paths, said valve means defining a substantially unrestricted surface between said passage and said rectifier plate in said second position and configured so as to provide a continuous flow surface along said passage and said rectifier plate when in its second position so as to provide no upstream gaps in the surface approaching said rectifier plate.

28. A cylinder head arrangement as set forth in claim 27 wherein the rectifier plate is contacted by the valve means upon movement of the valve means into its second position for limiting the degree of movement of said valve means.

29. A cylinder head arrangement as set forth in claim 28 wherein the valve means permits a free flow through both of the flow paths when in its first position and free flow through the other flow path when in its second position.

30. A cylinder head arrangement as set forth in claim 27 wherein the passage is formed by a pair of angularly related sections meeting at a bight, the valve means being positioned at the bight.

31. A cylinder head arrangement as set forth in claim 30 wherein the valve means is a rotary control valve rotating about an axis that is disposed substantially at the bight and which extends transversely to the flow path through the passage.

32. A cylinder head arrangement as set forth in claim 31 wherein the rotary control valve has a generally cylindrical configuration with a cut-out portion therein.

33. A cylinder head arrangement as set forth in claim 32 wherein the valve means provides a substantially continuous surface area with the cylinder head in each of its positions.

34. A cylinder head arrangement as set forth in claim 27 wherein there are a pair of passages each serving the same combustion chamber of the engine.

35. A cylinder head arrangement as set forth in claim 34 further including a throttle valve for controlling the flow through one of the passages for directing the flow to the combustion chamber through the other of the passages when the throttle valve is in its closed position.

36. A cylinder head arrangement as set forth in claim 35 wherein the rectifier plate and the valve means are disposed only in the other passage.

37. A cylinder head arrangement as set forth in claim 36 wherein the passages are each formed by a pair of angularly related sections meeting at a bight, the valve means being positioned at the bight.

38. A cylinder head arrangement as set forth in claim 27 wherein the valve means is a rotary control valve rotating about an axis that is disposed substantially at the bight and which extends transversely to the flow path through the passages.

39. A cylinder head arrangement as set forth in claim 38 wherein the throttle valve is rotatable about an axis that extends across the passages and wherein the valve means and the throttle valve rotate about parallel axes.

40. A cylinder head arrangement as set forth in claim 38 wherein the throttle valve rotates about an axis passing through the center of the one passage and wherein the valve means is a rotary control valve and the axis of the throttle valve extends generally perpendicularly to the axis of the control valve.

41. A cylinder head arrangement as set forth in claim 27 wherein the rectifier plate divides the passage so that the two separate flow paths have substantially different flow areas and wherein the valve means directs the flow through the smaller flow area when in its second position.

42. A valve seat and rectifier arrangement for insertion into a port formed in a cylinder head at the end of a passage extending through said cylinder head, a counterbore formed at said port, a valve seat pressed into said bore to form a valve seating area for cooperation with the head of an associated poppet valve, and a rectifier plate element having a plate portion extending into said passage and dividing the passage into a pair of generally parallel paths and said plate portion being connected to a base portion received in said counterbore and retained therein by said valve seat.

43. A valve seat and rectifier as set forth in claim 42 wherein the rectifier plate divides the passage so that the two separate flow paths have substantially different flow areas.

44. A cylinder head arrangement for an internal combustion engine comprising a passage extending from an opening in one surface area of said cylinder head to a valve seat formed in another surface area of said cylinder head, a rectifier plate extending uninterruptedly in said passage and terminating at said valve seat and defining two separate flow paths in said passage, both terminating only at said valve seat and valve means supported in said cylinder head and movable between a first position permitting unrestricted flow through both of said flow paths to said valve seat and a second position engaged with said rectifier plate and restricting flow through only one of said flow paths to said valve seat.

45. A cylinder head arrangement for an internal combustion engine comprising a passage extending from an opening in one surface area of said cylinder head to a valve seat formed in another surface area of said cylinder head, a rectifier plate extending uninterruptedly in said passage and terminating at said valve seat and defining two separate flow paths in said passage, and valve means supported in said cylinder head and movable between a first position permitting unrestricted flow through both of said flow paths and a second position engaged with said rectifier plate and restricting flow through only one of said flow paths, said rectifier plate being contacted by said valve means upon movement of said valve means into its second position for limiting the degree of movement of said valve means.

46. A cylinder head arrangement for an internal combustion engine comprising a passage extending from an opening in one surface area of said cylinder head to a valve seat formed in another surface area of said cylinder head, a rectifier plate extending uninterruptedly in said passage and terminating at said valve seat and defining two separate flow paths in said passage, and valve means supported in said cylinder head and movable between a first position permitting unrestricted flow through both of said flow paths and a second position engaged with said rectifier plate and restricting flow through only one of said flow paths, said rectifier plate being configured so as to offer substantially no flow resistance to the flow through said passage when said valve means is in its first position.

47. A cylinder head arrangement as set forth in claim 46 wherein the valve means permits a free flow through the other flow path when in its second position.

48. A cylinder head arrangement as set forth in claim 47 wherein the valve means is configured so as to provide a continuous flow surface along the passage and rectifier plate when in its second position so as to provide no upstream gaps in the surface approaching the rectifier plate.

49. A cylinder head arrangement as set forth in claim 48 wherein the rectifier plate is contacted by the valve means upon movement of the valve means into its second position for limiting the degree of movement of said valve means.

50. A cylinder head arrangement as set forth in claim 49 wherein the rectifier plate is configured so as to offer substantially no flow resistance to the flow through the passage when the valve means is in its first position.

51. A cylinder head arrangement as set forth in claim 48 wherein the passage is formed by a pair of angularly related sections meeting at a bight, the valve means being positioned at the bright.

52. A cylinder head arrangement as set forth in claim 51 wherein the valve means is a rotary control valve rotating about an axis that is disposed substantially at the bight and which extends transversely to the flow path through the passage.

53. A cylinder head arrangement as set forth in claim 52 wherein the rectifier plate is contacted by the valve means upon movement of the valve means into its second position for limiting the degree of movement of said valve means.

54. A cylinder head arrangement as set forth in claim 53 wherein the rectifier plate is configured so as to offer substantially no flow resistance to the flow through the passage when the valve means is in its first position.

* * * * *